Nov. 15, 1938.  B. G. JOHNSON  2,136,692
FOUR-WHEEL DRIVE
Filed Aug. 31, 1936  3 Sheets-Sheet 1
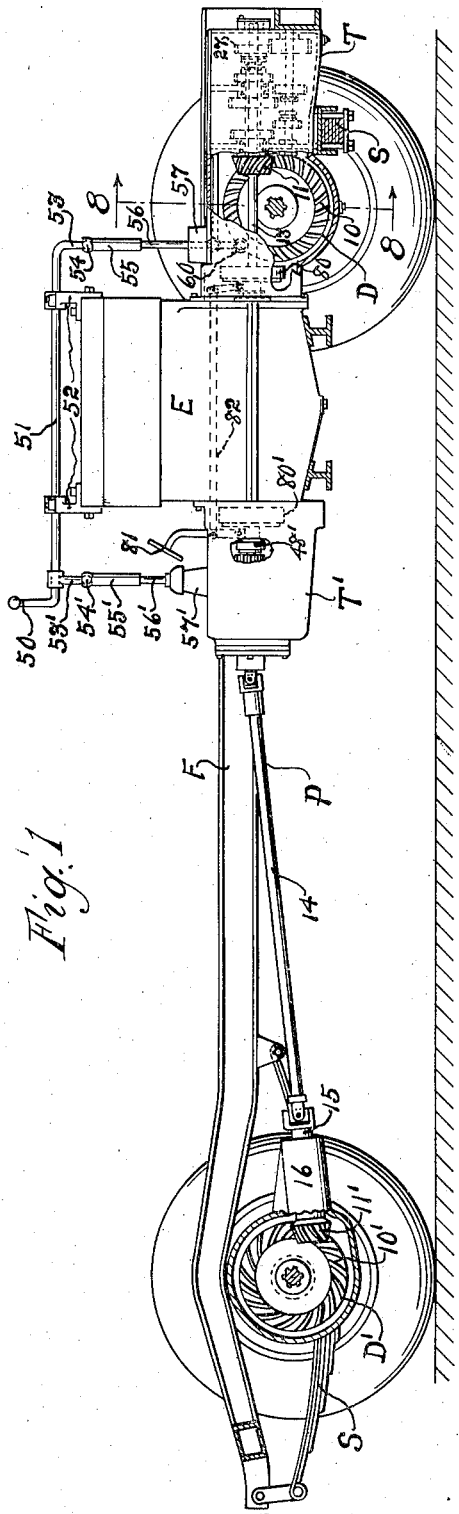
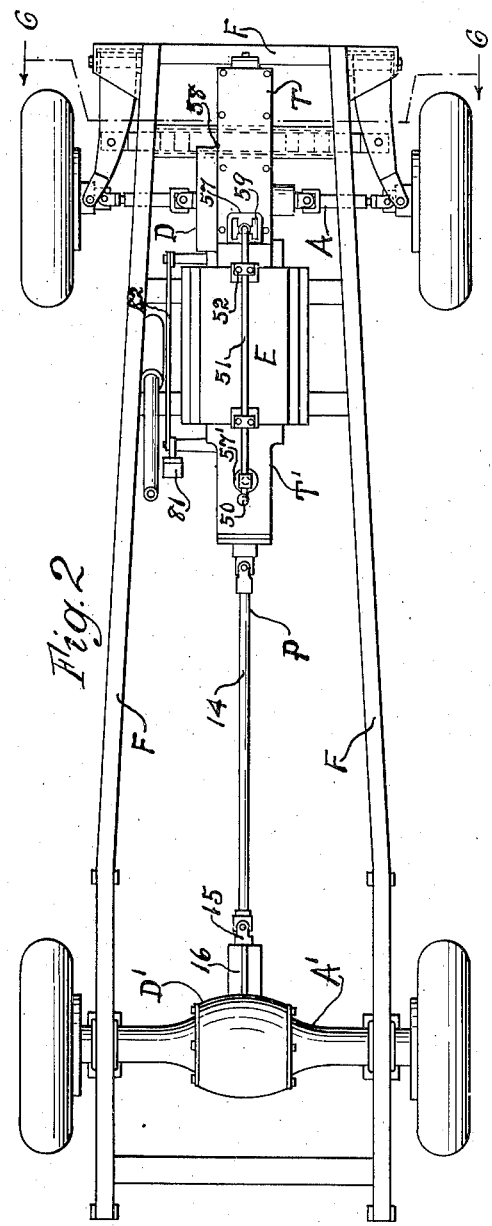
Inventor
Bror G. Johnson
by J. Daniel Stuwe
Attorney.

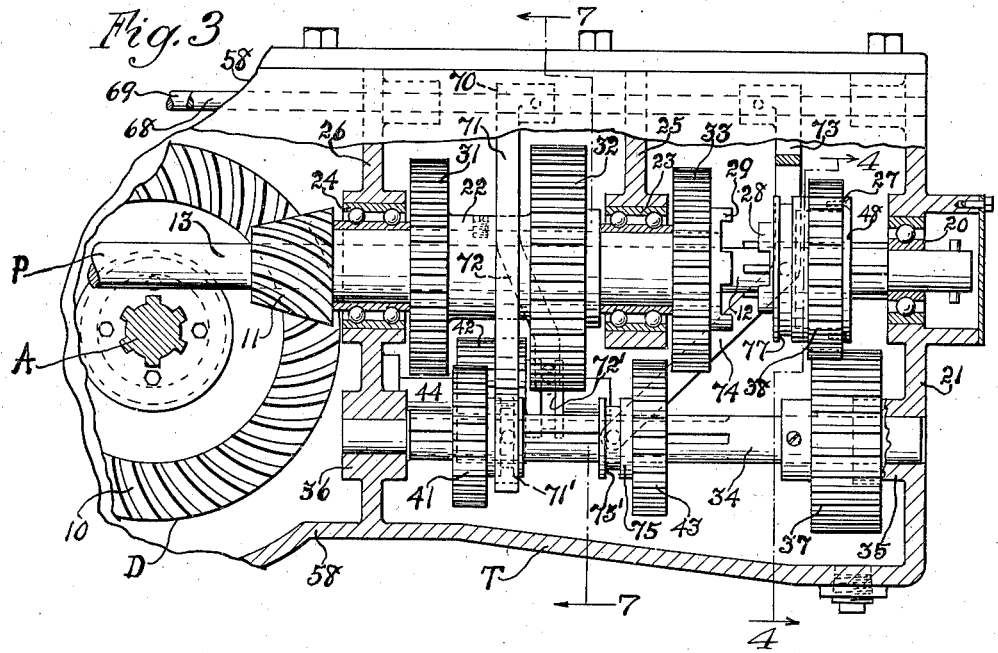

Nov. 15, 1938. B. G. JOHNSON 2,136,692
FOUR-WHEEL DRIVE
Filed Aug. 31, 1936 3 Sheets-Sheet 3

Inventor
Bror G. Johnson
by J Daniel Stuwe
Attorney.

from a neck 57 which arises from the rear part of a housing 58 which houses the gear mechanisms of the front transmission and also of the front differential.

In order to accommodate this front transmission mechanism T, the neck 57 contains a shift slot 59 which is H-shaped, as shown in Fig. 1, thru which the front shift lever 56 extends, and wherein it is shiftable laterally and longitudinally of the automobile, in harmony with the rear shift lever 56' and with the known gear shifts, the shift laterally being indicated by dot-and-dash lines 59' in Fig. 7. Said lever 56 has a rounded lower end which is turnable in a socket 60 provided on a bracket 61 in said housing 58, and has two oppositely extending side fingers or lugs 62 and 63 which are adapted to engage, respectively, in notches 64 and 65 formed in blocks 66 and 67 provided, respectively, on rods 68 and 69 which extend longitudinally of housing 58. Said rod 68 has a shifting yoke 70 secured thereon including an arm 71 the lower end of which has lug means engaging in a groove 71' formed in a neck portion provided on pinion 41; said yoke having another arm 72 with lug means on its lower end engaging in a groove 72' formed in a neck portion provided on idler 42; thus adapting said pinion 41 and said idler 42 to be shifted into and out of operative engagement with the low speed gear 31 and with the reverse gear 32, respectively, by moving the handle 50 laterally, in the usual manner of the standard gear shift, thereby engaging lug 62 in notch 64, and then shifting rod 68 in the appropriate direction. Rod 69 similarly has a shift yoke 73 secured thereon, including a pair of arms 74 the lower ends of which have lug means engaging in a groove 75' formed in a neck portion 75 provided on the second gear pinion 43, while the intermediate parts of said arms 74 have lug means engaging in a groove 77 formed in the rear portion of said combination member 27, thus adapting said second gear pinion 43 and the combination member 27 with clutch means 28 to be shifted into and out of operative engagement with second gear 33 and with the clutch means 29, respectively, by moving said handle 50 laterally in the usual appropriate manner, and thereby operating shift lever 56 and engaging lug 63 in its companion notch 65, and then shifting said rod 69, with said handle.

Front and rear clutch members 80 and 80', of an approved type, are provided between the front and rear ends of the engine E and the front and rear transmissions T and T', and a suitable pedal 81 is connected therewith by means 82 for operating the clutch members, in the usual manner.

I claim:

1. In an automobile having a front axle assembly, a differential in said axle assembly including a ring gear and a pinion engaging said gear at the upper forward part and having an integral forwardly extending sleeve, said gear and pinion being hypoid gears, a transmission shaft extending rotatively thru said pinion and sleeve, an engine on the shaft rearward of the ring gear, transmission means forward of said differential, including gears on said sleeve and sub-shaft means having gears shiftable to be engaged with said sleeve gears, a gear on the forward part of said subshaft means and a combination member slidable on the forward part of said transmission shaft having peripheral teeth engageable with said forward gear and also having a free-wheeling unit therein, clutch means on said combination member and on the forward end of said sleeve to couple them for direct driving of the pinion by the drive shaft, and a shift lever with means to shift said combination member and said gears on the subshaft means into operative engagement with the other gears.

2. In an automobile having front and rear axle assemblies, a differential in each assembly to actuate it and including each a ring gear and a pinion of hypoid gears, the front pinion engaging the front gear at the upper forward part and the rear pinion engaging the rear gear at the lower forward part, inclined shaft means including a front and a rear transmission shaft and a propeller shaft therebetween which are substantially alined, said shaft extending above the front axle, an engine interposed between said front shaft and propeller shaft, rearward of the front differential, a rear transmission including change-speed gearing interposed between the engine and the propeller shaft, a front transmission forward of the front differential and having a sleeve integral with the front pinion adapted to rotate on the front transmission shaft, sub-shaft means and interengageable gears thereon and on said sleeve, a gear secured on the front end of the subshaft means, a combination member slidable on the front shaft and having a free-wheeling unit therein and also teeth thereon engaging the last said gear, clutch means on the combination member and the sleeve to couple them and rotate said front shaft and pinion together, a free-wheeling unit connected with the rear transmission, and lever control means adjustable for operating the two transmissions together.

3. In an automobile having front and rear axle assemblies, a differential in each axle assembly and including each a ring gear and a driving pinion all of hypoid gears, the front pinion engaging the front gear at the upper forward part and the rear pinion engaging the rear gear at the lower forward part, inclined shaft means including a front and a rear transmission shaft and a propeller shaft therebetween which are substantially alined, the rear shaft being secured to the rear pinion and the front shaft extending above the front axle, thru the front pinion adapted to rotate therein, an engine interposed between the front shaft and the propeller shaft, rearward of the front differential, front and rear clutch means between the front and rear ends of the engine and the adjoining shafts, a rear transmission including change-speed gearing interposed between the engine and the propeller shaft, a front transmission forward of the front differential, including a sleeve fast on the front pinion and rotative therewith on the front shaft, also change-speed gearing associated with said sleeve, a free-wheeling unit connected with each of said front and rear transmissions, and lever means controllable for driving said two transmissions together.

BROR G. JOHNSON.

Patented Nov. 15, 1938

2,136,692

UNITED STATES PATENT OFFICE 2,136,692

FOUR-WHEEL DRIVE

Bror G. Johnson, Chicago, Ill.

Application August 31, 1936, Serial No. 98,682

3 Claims. (Cl. 180—44)

This invention relates to a new and improved four wheel drive.

In the present day rapidly traveling automobile it is desirable that the automobile or motor vehicle be equipped with driving means for driving all four wheels, to provide safe and steady traction under the various road conditions; and also to arrange such driving means so as to operate with constant and smooth transmission of power, and with as little friction and noise as possible. Furthermore, in order to provide more riding comfort for the rear seat passengers, it is found desirable to place the rear seat forward of the rear axle. And, as the front seat is conveniently mounted above and rearward of the engine or prime mover for operating the driving means, it is found advantageous to place the engine as far forward of the rear axle and as close to the front axle as possible. For that reason it is expeditious and I have found it desirable to mount the front transmission of such four-wheel driving mechanism forward of the front axle, and then to bring the engine forward close up to said axle.

A substantially straight drive shaft means with all its shaft parts alined has already been introduced, to provide a direct and steady drive for both axle assemblies of an automobile, as shown in my prior Patent No. 1,932,786, of October 31, 1933, for Four wheel drive for automobile. Hypoid gears have also been introduced in the driving means of automobiles, in place of the usual bevel gears, to provide a smoother and more constant transmission of the driving power. However, no driving mechanism with direct application and smooth transmission of the driving power for driving both axle assemblies, or for driving the front axle assembly, has heretofore been adapted for use wherein the front transmission is mounted forward of the front axle and the engine is brought forward to the rear of said front axle, except where such front transmission has included therein a sub-shaft with gears which are needed for driving in all speeds, thereby again causing increased friction and noise, and dissipating all benefit of any smooth transmission or direct application of the driving power.

It is therefore an essential object and purpose of this invention to provide an improved four wheel drive for automobiles and similar motor vehicles, wherein the engine is close to the front axle, to provide extended space between the engine and the rear axle, and comprising alined drive shaft means which drives directly both drive pinions of the front and rear axle assemblies, in the high speed or usual traveling speed.

A more specific object of this invention is to provide a driving mechanism for driving the front and rear axle assemblies of an automobile by means of an alined drive shaft which carries the two drive pinions adjacent its two ends, for directly driving the same and thereby the two ring gears and the two axle assemblies; and which shaft is extended at an incline to the chassis, from the rear axle assembly to a distance forward of the front axle assembly, thereby enabling the placing of the front transmission forward of the front axle, which is conveniently accomplished by the use of hypoid gears for both sets of ring gears and driving pinions.

Another object of this invention is to provide in an automobile an improved driving mechanism for driving the front axle assembly, wherein the engine is placed close to the rear of the front axle and the transmission is mounted forward of said axle, and hypoid gears are used to transfer the driving power directly thru one main drive shaft, without the use of any sub-shaft while driving in high gear or the usual driving speed.

These and various other objects and advantages are attained with this invention, as will become apparent from the following description, taken in connection with the accompanying drawings in which the invention is shown in its preferred form, it being understood that various other arrangements and forms of construction may be adopted for carrying out the objects and purposes of this invention.

In the drawings:

Fig. 1 is a longitudinal vertical section of an automobile equipped with my invention, parts being broken away.

Fig. 2 is a plan view thereof.

Fig. 3 is an elevational detail of the front transmission, being partly in section and in the neutral position.

Fig. 4 is a vertical section of the free-wheeling unit, on line 4—4 of Fig. 3.

Fig. 5 is an elevational view similar to Fig. 3, but showing the transmission mechanism in the high speed position.

Figure 6:
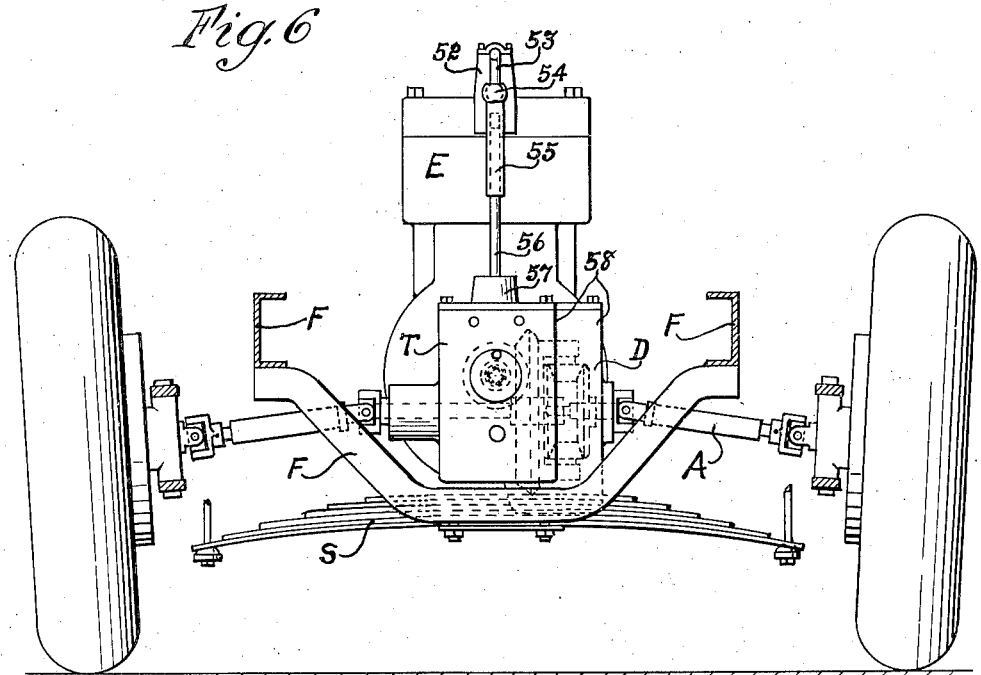
Fig. 6 is an enlarged vertical section, on line 6—6 of Fig. 2.
Figure 7:
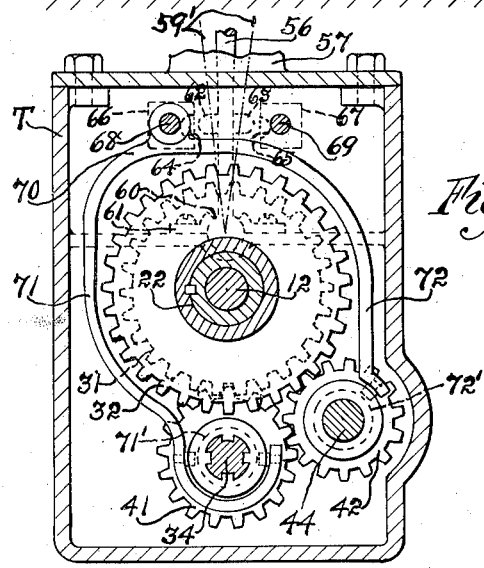
Fig. 7 is a vertical section, on line 7—7 of Fig. 3.
Figure 8:
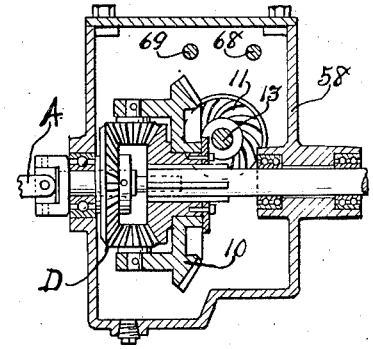
Fig. 8 is an enlarged vertical section, on line 8—8 of Fig. 1.

In the drawings my invention is illustrated in